United States Patent
Kim et al.

(10) Patent No.: US 11,456,446 B2
(45) Date of Patent: Sep. 27, 2022

(54) METHOD FOR PRE-LITHIATION OF NEGATIVE ELECTRODE FOR SECONDARY BATTERY

(71) Applicant: LG CHEM, LTD., Seoul (KR)

(72) Inventors: Ye Ri Kim, Daejeon (KR); Sang Wook Woo, Daejeon (KR); Oh Byong Chae, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 4 days.

(21) Appl. No.: 17/040,405

(22) PCT Filed: Jan. 30, 2020

(86) PCT No.: PCT/KR2020/001383
§ 371 (c)(1),
(2) Date: Sep. 22, 2020

(87) PCT Pub. No.: WO2020/159236
PCT Pub. Date: Aug. 6, 2020

(65) Prior Publication Data
US 2021/0066703 A1    Mar. 4, 2021

(30) Foreign Application Priority Data
Jan. 31, 2019   (KR) .......................... 10-2019-0012626

(51) Int. Cl.
*H01M 4/04*   (2006.01)
*H01M 4/36*   (2006.01)
(Continued)

(52) U.S. Cl.
CPC ....... *H01M 4/0435* (2013.01); *H01M 4/0404* (2013.01); *H01M 4/0416* (2013.01);
(Continued)

(58) Field of Classification Search
CPC ............. H01M 4/0404; H01M 4/0416; H01M 4/0435; H01M 4/0445; H01M 4/364; H01M 10/0525; H01M 2004/027
(Continued)

(56) References Cited

U.S. PATENT DOCUMENTS

| | | | |
|---|---|---|---|
| 2004/0191629 A1* | 9/2004 | Itaya | H01M 4/0402 429/231.95 |
| 2010/0255356 A1 | 10/2010 | Fujii et al. | |

(Continued)

FOREIGN PATENT DOCUMENTS

| | | |
|---|---|---|
| CN | 108417774 A | 8/2018 |
| CN | 109065826 A | 12/2018 |

(Continued)

OTHER PUBLICATIONS

Extended European Search Report dated Apr. 29, 2021, for European Application No. 20748798.4.
(Continued)

*Primary Examiner* — Brian K Talbot
(74) *Attorney, Agent, or Firm* — Birch, Stewart, Kolasch & Birch, LLP (57) ABSTRACT

A method for pre-lithiation of a negative electrode for a secondary battery, for reducing the time required for pre-lithiation and reducing changes in volume of the electrode. The method includes immersing a negative electrode for a secondary battery in the electrolyte to perform electrolyte impregnation, and pre-lithiating the negative electrode. Immersing the negative electrode for the secondary battery in an electrolyte includes introducing the prepared negative electrode into an electrolyte bath containing the electrolyte, and removing air bubbles and moisture in the negative electrode by applying a vacuum to the electrolyte bath in which the negative electrode is immersed.

12 Claims, 2 Drawing Sheets

Putting negative electrode into electrolyte bath — S10

Applying vacuum to electrolyte bath where negative electrode is immersed — S20

Prelithiating negative electrode — S30

(51) Int. Cl.
*H01M 10/0525* (2010.01)
*H01M 4/02* (2006.01)

(52) U.S. Cl.
CPC ......... *H01M 4/0445* (2013.01); *H01M 4/364* (2013.01); *H01M 10/0525* (2013.01); *H01M 2004/027* (2013.01)

(58) Field of Classification Search
USPC ...................... 429/231.95; 427/115
See application file for complete search history.

(56) References Cited

U.S. PATENT DOCUMENTS

| | | | |
|---|---|---|---|
| 2010/0313410 | A1 | 12/2010 | Min et al. |
| 2011/0269020 | A1 | 11/2011 | Kamiyama et al. |
| 2014/0310951 | A1 | 10/2014 | Grant et al. |
| 2015/0191841 | A1* | 7/2015 | Grant ................. H01M 4/139 205/59 |
| 2016/0126543 | A1 | 5/2016 | Ota et al. |
| 2016/0141596 | A1* | 5/2016 | Uhm ................. H01M 4/0435 429/231.95 |
| 2017/0288276 | A1* | 10/2017 | Tsiouvaras ........ H01M 10/0525 |
| 2019/0036118 | A1* | 1/2019 | Ofer ................. H01M 4/0459 |
| 2020/0161625 | A1* | 5/2020 | Vega ................. H01M 10/0567 |

FOREIGN PATENT DOCUMENTS

| | | | |
|---|---|---|---|
| JP | 2000173574 A | * | 6/2000 |
| JP | 2010-33918 A | | 2/2010 |
| JP | 2010-232469 A | | 10/2010 |
| JP | 2014-120555 A | | 6/2014 |
| JP | 2014-165221 A | | 9/2014 |
| JP | 2016-511916 A | | 4/2016 |
| KR | 10-2004-0084858 A | | 10/2004 |
| KR | 10-2015-0014877 A | | 2/2015 |
| KR | 10-2015-0110797 A | | 10/2015 |
| KR | 10-2017-0111741 A | | 10/2017 |
| KR | 10-2018-0104174 A | | 9/2018 |
| WO | WO 2010/079754 A | | 7/2010 |
| WO | WO 2018/212453 A1 | | 11/2018 |

OTHER PUBLICATIONS

International Search Report for PCT/KR2020/001383 dated May 12, 2020.

* cited by examiner

METHOD FOR PRE-LITHIATION OF NEGATIVE ELECTRODE FOR SECONDARY BATTERY

TECHNICAL FIELD

This application claims the benefit of priority based on Korean Patent Application No. 10-2019-0012626, filed on Jan. 31, 2019, and the entire contents of the Korean patent application are incorporated herein by reference.

The present invention relates to a method of pre-lithiating a negative electrode for a secondary battery, and more particularly, to a pre-lithiation method of negative electrode by immersing the negative electrode in an electrolyte solution to be impregnated, and applying vacuum after impregnation, and then performing present invention, before assembling a lithium secondary battery.

BACKGROUND ART

The present invention relates to a negative electrode active material for a secondary battery, a negative electrode including the same and a method for manufacturing the same. More specifically, the present invention relates to a negative electrode active material having improved cycle swelling and high rate charging property, a negative electrode, and a method for manufacturing the same.

As the price of energy sources increases due to depletion of fossil fuels and the interest in environmental pollution increases, the demand for environmentally friendly alternative energy sources becomes an indispensable factor for future life. Especially, as technology development and demand for mobile devices are increasing, demand for secondary batteries as energy sources is rapidly increasing.

Typically, in terms of the shape of the battery, there is a high demand for a prismatic secondary battery and a pouch-type secondary battery that can be applied to products such as mobile phones with a small thickness. In terms of materials, there is a high demand for lithium secondary batteries such as lithium ion batteries and lithium ion polymer batteries having high energy density, discharge voltage, and output stability.

Generally, in order to prepare a secondary battery, first, a positive electrode and a negative electrode are formed by applying an electrode mixture containing an electrode active material to a surface of a current collector, then a separate is interposed therebetween to thereby make an electrode assembly, which is then mounted in a cylindrical or rectangular metal can or inside a pouch-type case of an aluminum laminate sheet, and a liquid electrolyte is injected or impregnated into the electrode assembly or a solid electrolyte to prepare a secondary battery.

Further, secondary batteries are classified according to the structure of the electrode assembly having a positive electrode/separator/negative electrode structure. Representative examples thereof include a jelly-roll (wound) electrode assembly in which long sheet type positive electrodes and negative electrodes are wound with a separator interposed therebetween, a stacked electrode assembly in which a plurality of positive and negative electrodes cut in a predetermined size unit are sequentially stacked with a separator interposed therebetween, and a stacked/foldable electrode assembly in which bi-cells or full cells, in which positive and negative electrodes of a predetermined unit are stacked with a separator interposed therebetween, are wound with a separator sheet.

On the other hand, the electrode generates a current through the exchange of ions, and the positive electrode and negative electrode constituting the electrode has a structure in which the electrode active material is applied to the electrode current collector made of metal.

Among them, in the case of the negative electrode, in the related art, lithium metal was used as a negative electrode in the secondary battery. However, as the short circuit of the battery due to the formation of dendrites and the risk of explosion caused by this are known, lithium metal is being replaced with a silicon-based compound or a carbon-based compound capable of reversible intercalation and desorption of lithium ions while maintaining structural and electrical properties.

However, the theoretical capacity density of carbon as an active material used as a negative electrode is 372 mAh/g (833 mAh/cm$^3$). Therefore, in order to improve the energy density of the negative electrode, silicon (Si), tin (Sn), oxides and alloys thereof which are alloyed with lithium are considered as negative electrode materials. Among them, silicon-based materials have attracted attention due to their low cost and high capacity (4200 mAh/g).

However, the silicon has a problem in that volume change (shrinkage or expansion) occurs during the insertion/removal of lithium ions, resulting in deterioration of mechanical stability, and as a result, cycle characteristics are impaired and the initial irreversible capacity becomes large. Therefore, it is necessary to develop a material having structural stability, which is excellent in stability when used as an active material of an electrochemical device, and capable of ensuring cycle characteristics.

In order to solve the above problems, a method of pre-lithiating a negative electrode including a silicon-based negative electrode active material is known. As a pre-lithiation method, known methods include a method of producing an electrode by lithiating a negative electrode active material by a physicochemical method and a method of electrochemically pre-lithiating a negative electrode.

Korean Patent Publication No. 10-2015-0014676 discloses a method for pre-lithiating the surface of a negative electrode. Specifically, a method of pre-lithiating a surface of a negative electrode by immersing a roll, which is generated by rolling the negative electrode with metallic lithium on both sides of the negative electrode, in the electrolyte, is disclosed. Through the above method, a stable film is formed on the surface of the negative electrode and the film formation reaction that occurs during initial charging is performed in advance, so that no capacity drop occurs.

However, in the case of the above prior art, since the bubbles and moisture present in the micropores in the electrode are not removed in the process of immersing and impregnating the electrode in the electrolyte solution, it is difficult for lithium ions to enter into a space between the active materials in the subsequent pre-lithiation process, and thus pre-lithiation may take a long time, and the thickness of the electrode may become thick due to bubbles and moisture.

Therefore, there is a need for technology development for solving the problem.

DISCLOSURE

Technical Problem

The present invention was created to solve the above problems, and an object of the present invention is to provide a method for pre-lithiating a negative electrode for a secondary battery, which shortens the time required for the pre-lithiation process and minimizes the volume change of the electrode after pre-lithiation, a negative electrode for a secondary battery manufactured according to the above method and its manufacturing method.

Technical Solution

The method of pre-lithiating a negative electrode for a secondary battery according to the present invention includes:

immersing the negative electrode for a secondary battery in an electrolyte to perform electrolyte impregnation; and pre-lithiating the negative electrode.

Immersing the negative electrode for the secondary battery in an electrolyte includes: injecting the prepared negative electrode into the electrolyte bath containing the electrolyte; and removing air bubbles and moisture in the negative electrode by applying a vacuum to the electrolyte bath in which the negative electrode is immersed.

Further, in the method for pre-lithiating the negative electrode for a secondary battery according to the present invention, the vacuum may be repeatedly applied twice or more.

Further, in the method for pre-lithiating the negative electrode for a secondary battery according to the present invention, in the vacuum application step, each vacuum may be applied for a time of 1 second to 60 seconds.

Further, in the method for pre-lithiating the negative electrode for a secondary battery according to the present invention, the vacuum may be applied at an interval of 1 second to 60 seconds.

Further, in the method for pre-lithiating the negative electrode for a secondary battery according to the present invention, the vacuum may be applied to the electrolyte bath for a total time of 30 seconds to 300 seconds.

Further, in the method for pre-lithiating the negative electrode for a secondary battery according to the present invention, the vacuum may be performed within a time of 5 minutes to 60 minutes after the negative electrode is injected into the electrolyte bath.

Further, in the method for pre-lithiating the negative electrode for a secondary battery according to the present invention, pre-lithiating the negative electrode includes introducing lithium ions onto the negative electrode active material by a physicochemical method or electrochemical method.

Further, in the method for pre-lithiating the negative electrode for a secondary battery according to the present invention, pre-lithiating the negative electrode further include a stabilization step of leaving the lithiated negative electrode.

Further, in the method for pre-lithiating the negative electrode for a secondary battery according to the present invention, the physicochemical method may be a method in which lithium metal is brought into direct contact with the negative electrode.

Further, in the method for pre-lithiating the negative electrode for a secondary battery according to the present invention, contact time between the negative electrode and lithium metal may be 30 minutes to 10 hours.

Further, in the method for pre-lithiating the negative electrode for a secondary battery according to the present invention, the electrochemical method may be a method of lithiating the surface of the negative electrode by applying current or voltage to the negative electrode.

Further, in the method for pre-lithiating the negative electrode for a secondary battery according to the present invention, CC-charging may be performed with a current amount of 0.01 C to 0.5 C, and CV-charging may be performed when reaching 0.001V to 0.01V.

Further, in the method for pre-lithiating the negative electrode for a secondary battery according to the present invention, a time for immersing the negative electrode in the electrolyte may be 6 hours to 48 hours.

In addition, the present invention provides a method for manufacturing a negative electrode for a secondary battery, and the method includes:

preparing a negative electrode slurry by mixing a negative electrode active material, a conductive material, and a binder;

coating the negative electrode slurry on a current collector;

rolling the current collector coated with the negative electrode slurry and punching and drying the current collector to be unit electrodes; and pre-lithiating the unit electrodes according to the pre-lithiation method.

In addition, the present invention provides a secondary battery including the negative electrode for the secondary battery, and the negative electrode is as described above.

Advantageous Effects

When using the method of pre-lithiating the negative electrode for a secondary battery provided by the present invention, it is possible to shorten the time required for the pre-lithiation process and minimize the volume change of the electrode after pre-lithiation. In addition, the contact loss of the electrode is reduced, and accordingly, a secondary battery having excellent cycle performance and capacity retention can be provided.

DETAILED DESCRIPTION OF THE PREFERRED EMBODIMENTS

The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention. Accordingly, the embodiments described in the specification and the configurations described in the drawings are only the most preferred embodiments of the present invention, and do not represent all of the technical ideas of the present invention. It is to be understood that there may be various equivalents and variations in place of them at the time of filing the present application.

In the present specification, when a part is "connected" to another part, this includes not only "directly connected" but also "electrically connected" between the parts while having another element therebetween.

In this application, it should be understood that terms such as "include" or "have" are intended to indicate that there is a feature, number, step, operation, component, part, or a combination thereof described on the specification, and they do not exclude in advance the possibility of the presence or addition of one or more other features or numbers, steps, operations, components, parts or combinations thereof. Also, when a portion such as a layer, a film, an area, a plate, etc. is referred to as being "on" another portion, this includes not only the case where the portion is "directly on" the another portion but also the case where further another portion is interposed therebetween. On the other hand, when a portion such as a layer, a film, an area, a plate, etc. is referred to as being "under" another portion, this includes not only the case where the portion is "directly under" the another portion but also the case where further another portion is interposed therebetween. In addition, to be disposed "on" in the present application may include the case disposed at the bottom as well as the top.

As used throughout this specification, the terms "about", "substantially", and the like, are used to mean a value or something like this when unique manufacturing and material tolerances are presented, and the terms are used to prevent unscrupulous infringers from unfair use of the disclosure including accurate or absolute figures in order to aid in the understanding of the present disclosure.

Hereinafter, the present invention will be described in detail.

Figure 1:
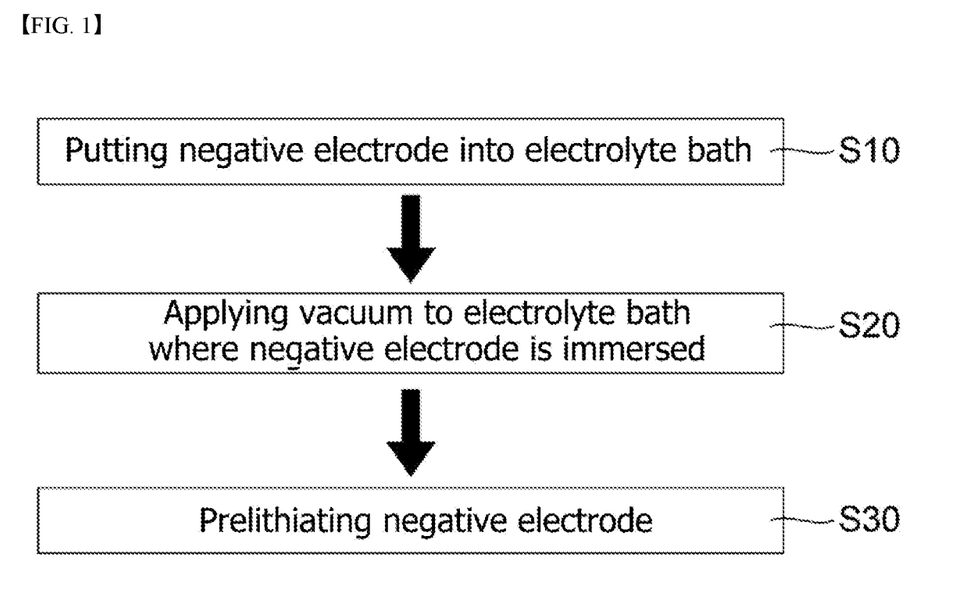
FIG. 1 is a flowchart showing the flow of a method for pre-lithiating a negative electrode for a secondary battery according to the present invention.

FIG. 1 is a flowchart showing the flow of a method for pre-lithiating a negative electrode for a secondary battery according to the present invention.

Referring to FIG. 1, an electrolyte impregnation step of immersing a negative electrode for secondary batteries in an electrolyte; and a pre-lithiation step of pre-lithiating the negative electrode (S30) are included.

The electrolyte impregnation step includes: a step of injecting the prepared negative electrode into the electrolyte bath containing the electrolyte (S10); and a vacuum application step of removing air bubbles and moisture in the negative electrode by applying a vacuum to the electrolyte bath in which the negative electrode is immersed (S20).

Specifically, the method of pre-lithiating a negative electrode for a secondary battery according to the present invention is to apply a vacuum in the process of impregnating the electrolyte by putting the negative electrode into the electrolyte bath and then pre-lithiating the negative electrode.

As described above, in the case of using a silicon-based negative electrode active material among negative electrode active materials, a problem arises in that the initial irreversible capacity is large. In the charging and discharging reaction of the lithium secondary battery, lithium discharged from the positive electrode is inserted into the negative electrode during charging, and is released from the negative electrode to return to the positive electrode during discharging. In the case of the silicon negative electrode active material, the volume change and the surface side reaction are severe. Specifically, the silicon-based negative electrode active material has a large volume change due to a conversion reaction or an alloying reaction. In the case of the alloying reaction, the negative electrode active material containing Si elements or metal elements has a large structural change and large volume expansion during the metal alloying process with Li. In forming $Li_{+\chi}M_{-102}$, the host metal (M) not only accumulates Li ions but also accepts the same number of electrons as Li ions. In other words, the metal becomes an anion having a larger radius than the neutral atom by the next charge transfer reaction.

$$M^0 + \chi e^- \leftrightarrow M^{\chi-}$$

As a result, the volume of Li-inserted metal is increased by 100 to 400% compared to the case without Li.

Due to this, a large amount of lithium inserted in the negative electrode during initial charging does not return to the positive electrode again, and thus an initial irreversible capacity is increased. When the initial irreversible capacity increases, there occurs a problem that the battery capacity and the cycle are rapidly reduced.

Herein, the irreversible capacity is a capacity lost in the first charge/discharge cycle. That is, in a charge/discharge reaction of a conventional secondary battery, lithium discharged from a positive electrode is stored in a negative electrode during charging, and lithium discharged from the negative electrode is stored in the positive electrode during discharging. Therefore, when the irreversible capacity at the negative electrode is large at the first charge/discharge, the negative electrode and the positive electrode lose a part of the reversible capacity originally possessed, so that the secondary battery cannot be obtained. Here, the irreversible capacity of the negative electrode is considered to be the cause of the reduction in available reversible capacity as lithium is partially inactivated by side reaction with the electrolyte during charging, or it becomes residual of reversible lithium due to hysteresis of the intercalate/release potential of lithium.

Therefore, according to the method of pre-lithiating the negative electrode active material for a secondary battery according to the present invention, the negative electrode active material is preliminarily lithiated prior to initial charging and discharging, and thus as the active material is lithiated, less irreversible reaction occurs during charging and discharging, so that the initial irreversible degree of the electrode can be controlled.

In the electrolyte impregnation step, the negative electrode is immersed by being introduced into the electrolyte bath containing the electrolyte. The electrolyte is a form in which a lithium salt is dissolved in a solvent, and the type is not limited as long as the negative electrode active material promotes a side reaction that will be experienced during initial charging. Specifically, examples of the lithium salt include one or more selected from the group consisting of LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, and lithium 4-phenylborate, and examples of the solvent include one or a mixture of two or more selected from the group consisting of propylene carbonate, ethylene carbonate, butylene carbonate, dimethyl carbonate, diethyl carbonate, ethyl methyl carbonate, gamma-butylolactone, and 1,2-dimethoxyethane.

By adding an SEI film forming additive to the electrolyte, a film suitable for the characteristics of the negative electrode can be formed.

As described above, as the negative electrode is immersed and impregnated in the electrolyte, the volume of the negative electrode expands to a certain level and the distance between the particles of the negative electrode active material increases appropriately, allowing the electrolyte to penetrate deeply between the particles. Therefore, the contact area between the electrolyte and the negative electrode increases, so that lithium ions can penetrate into the negative electrode better by direct contact.

In the electrolyte impregnation step, the time for immersing the negative electrode in the electrolyte may be 6 hours to 48 hours, and more preferably 12 hours to 36 hours. When the electrolyte immersion time is less than 6 hours, the negative electrode does not expand sufficiently and the electrolyte does not penetrate deeply inside the negative electrode, and thus pre-lithiation by direct contact in the subsequent step does not occur sufficiently. Further, when the electrolyte immersion time exceeds 48 hours, the negative electrode is exposed to the electrolyte for too long, and thus the shape stability becomes poor, and the adhesion of the electrode decreases, thereby decreasing the cell balance.

When the negative electrode is introduced into the electrolytic bath, vacuum is applied to the electrolyte bath. By applying a vacuum, air bubbles and moisture in the negative electrode are removed in advance to shorten the time spent in the pre-lithiation process, and it is possible to reduce the rate of increase in cell thickness that occurs during charging and discharging after cell manufacturing.

Figure 2:
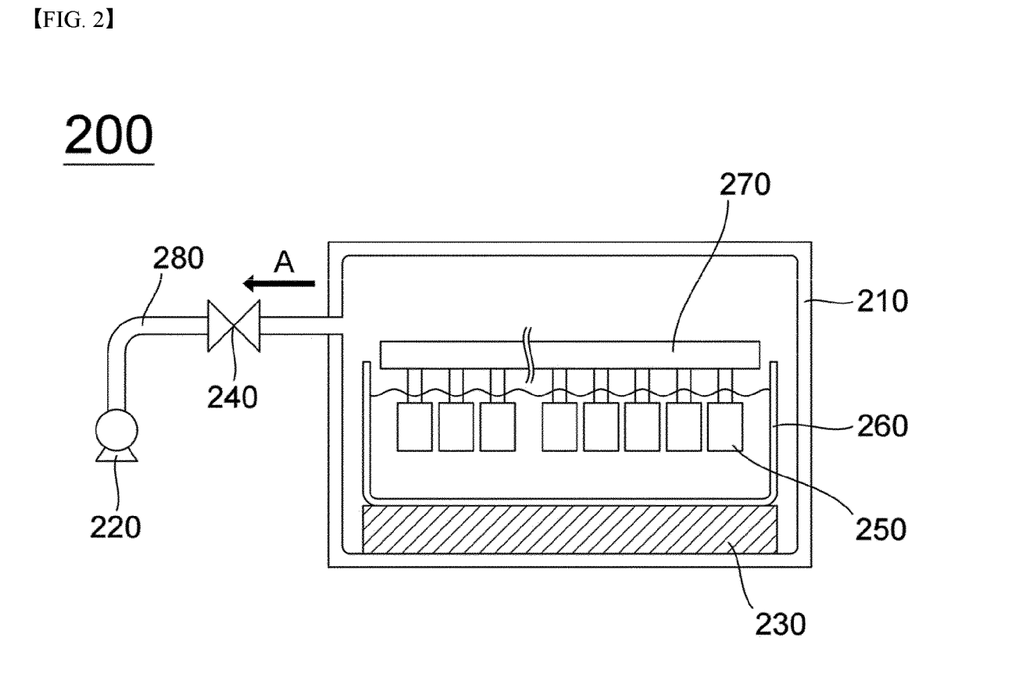
FIG. 2 is a schematic view showing an apparatus for applying vacuum to a negative electrode and a vacuum application method in a method of pre-lithiating a negative electrode for a secondary battery according to the present invention.

FIG. 2 is a schematic view showing an apparatus for applying vacuum to a negative electrode and a vacuum application method in a method of pre-lithiating a negative electrode for a secondary battery according to the present invention.

Referring to FIG. 2, an apparatus 200 for applying the vacuum includes a vacuum chamber 210, a vacuum pump 220, a support 230, a valve 240 and a control device (not shown).

Specifically, the vacuum chamber 210 is a space for accommodating an electrolyte bath 260 into which a negative electrode 250 is injected, and creating a vacuum state. The vacuum chamber 210 can accommodate one or more of the electrolytic baths 260, and there is no limitation in the form. FIG. 2 shows a state in which one electrolyte bath 260 is accommodated, but a size that can accommodate as many electrolyte baths as possible is preferable for efficiency of battery production. In addition, a number of negative electrodes 250 may be input to the electrolyte bath 260 to undergo an electrolyte impregnation process, and a jig 270 is provided to support the plurality of negative electrodes.

In addition, a support 230 for supporting the electrolyte bath 260 may be provided in the vacuum chamber 210, and the support 230 is provided with a receiving groove (not shown) to support or fix the electrolyte bath 260. In addition, an exhaust pipe 280 is connected to the vacuum chamber 210, and a valve 240 and a vacuum pump 220 are connected to the exhaust pipe 280.

The vacuum pump 220 is a device that exhausts air in the vacuum chamber 210 to make the inside of the vacuum chamber 210 a vacuum atmosphere, and when the vacuum pump 220 operates, air in the vacuum chamber 210 exits through the exhaust pipe 280.

That is, in the vacuum application step of the pre-lithiation method according to the present invention, the vacuum of the electrolyte bath 260 is applied by removing (A) the air in the vacuum chamber 210 through the exhaust pipe 280 by the vacuum pump 220 in a state fixed to the support 230 in the closed vacuum chamber 210.

At this time, the valve 240 controls the vacuum state of the vacuum chamber 210. Specifically, the valve 240 controls the time and number of times the vacuum is applied during the electrolyte impregnation step. The operation of the valve 240 is controlled by a control device.

The vacuum application step may be applied twice or more times by repeating the vacuum, preferably three or more times.

In addition, in the vacuum application step, the time at which each vacuum is applied may be 1 second to 60 seconds, preferably 10 seconds to 50 seconds, and more preferably 20 seconds to 40 seconds. When the vacuum application time is within the above range, bubbles and moisture in the electrode can be effectively removed.

When the vacuum application time per each time is less than 1 second, since the vacuum application time is too short, removal of moisture and bubbles present in the micropores inside the electrode may not be smooth even when vacuum is applied, and when the vacuum application time exceeds 60 seconds, the efficiency of bubbles and moisture removal may be reduced, which is undesirable.

That is, in the vacuum application step, it is preferable in terms of air bubbles and moisture removal that the vacuum is repeatedly applied several times for a short period of time rather than once for a long time. For example, it is more efficient to apply 30 times at regular intervals three times than to apply vacuum once for 90 seconds.

When the vacuum is applied several times as described above, the time interval between the vacuum applications may be 1 second to 60 seconds, more preferably 5 seconds to 45 seconds, and most preferably 10 seconds to 30 seconds. When the time interval is less than 1 second, the difference from the effect of applying the vacuum once for a long time is not large, and when the time interval exceeds 60 seconds, bubbles may occur again during the time interval between vacuum applications, so the effect of vacuum application may not be large.

In addition, in the vacuum application step, the total time during which the vacuum is applied to the electrolyte bath may be 30 seconds to 300 seconds, more preferably 60 seconds to 200 seconds, and most preferably 90 seconds to 150 seconds. Here, the total time for which a vacuum is applied means a time in which each time for which a vacuum is applied is added up. When the total time to apply vacuum is less than 30 seconds, as the result of insufficient vacuum application time, the removal of moisture and bubbles present in the micropores inside the electrode is not smooth, and the thickness change amount during charging and discharging of the battery may increase afterwards. If the total time exceeds 300 seconds, the impregnation process of the electrolyte may not be smooth due to the application of vacuum.

In addition, in the step of applying the vacuum, it is preferable to wet the negative electrode, which is in a state that a large amount of water or air bubbles have been removed, by an electrolyte solution, by putting a negative electrode into the electrolyte bath and applying a vacuum within a certain time. Even if applying vacuum to remove moisture or air bubbles in the negative electrode, some bubbles may remain in the negative electrode. Hence, as described above, the method of removing a large amount of air bubbles in the negative electrode by first applying a vacuum and then removing the remaining air bubbles through wetting of the negative electrode can effectively remove the air bubbles in the negative electrode and can allow the electrolyte in the negative electrode to be impregnated well. Specifically, the step of applying the vacuum may be performed within 5 to 60 minutes, and more preferably, within 10 to 30 minutes, after the negative electrode is introduced into the electrolyte bath. If the vacuum application is performed within less than 5 minutes after the negative electrode is introduced into the electrolyte bath, the efficiency of air bubbles or water removal may decrease. If the vacuum application is performed within a time exceeding 60 minutes after the negative electrode is introduced into the electrolyte bath, the vacuum application may become too late, which may increase the time required for pre-lithiation preparation.

When the electrolyte impregnation step is completed, the negative electrode undergoes a pre-lithiation step. The pre-lithiation step is a step of introducing lithium ions onto the negative electrode active material by a physicochemical or electrochemical method.

Figure 3:
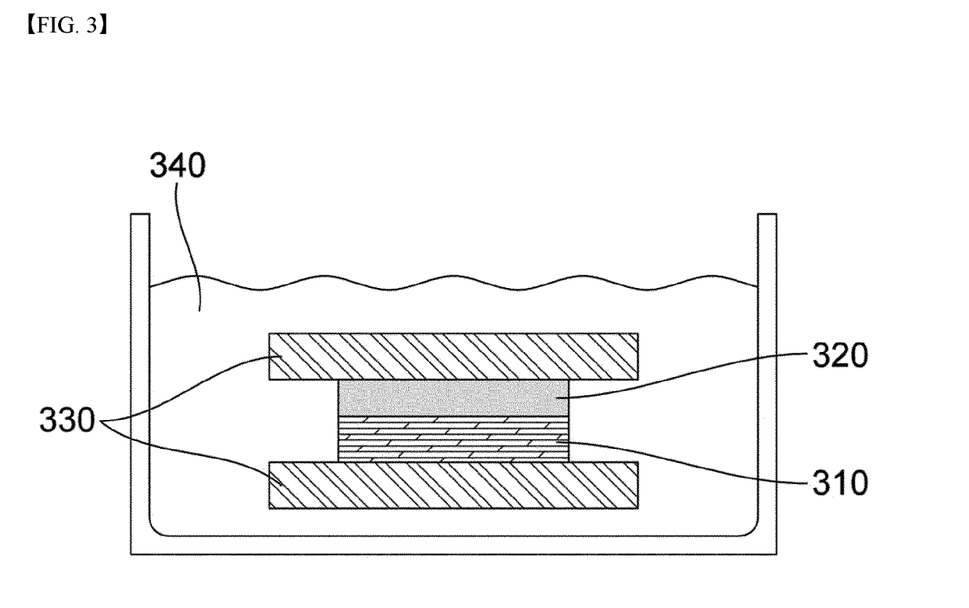
FIG. 3 is a schematic view showing a method of performing pre-lithiation by bringing lithium metal into contact with a negative electrode.

FIG. 3 is a schematic view showing a method of performing pre-lithiation by bringing lithium metal into contact with a negative electrode.

Referring to FIG. 3, the physicochemical method is a method of directly bringing the lithium metal 320 into contact with the negative electrode 310. Specifically, the negative electrode 310 and the lithium metal 320 can be fixed to the pre-lithiation jig 330, and this process can be performed in the electrolyte 340. In this case, by direct contact of the negative electrode 310 and the lithium metal 320, lithium enters a space between the negative electrode 310 and establishes a position similar to the initial irreversible situation, and the space is less irreversible in subsequent charging, and thus it becomes possible to control the initial irreversible degree of the negative electrode 310. In addition, the lithium metal 320 is preferably an area that can cover the entire negative electrode (310).

In addition, when the lithium metal 320 is in contact with the negative electrode 310, a predetermined pressure may be applied to the negative electrode 310 and the lithium metal 320 through the pre-lithiation jig 330. The lithium metal 320 is placed on the negative electrode 310 and a constant force is applied from above and below to bring the negative electrode 310 into direct contact with the lithium metal 320. At this time, a method of applying a force to the lithium metal 320 is not limited. The lithium metal 320 may be placed on the negative electrode 310, and the pre-lithiation jig 330 may be fastened, thereby allowing pressure to be applied to the center from the upper side and the lower side of the contact surface between the negative electrode 310 and the lithium metal 320. It is also possible to apply a pressure to the contact surface between the negative electrode and the lithium metal by using a press machine or the like.

When pressure is applied for the pre-lithiation of the first step, the pressure may be 1 to 50 kgf, preferably 10 to 40 kgf, most preferably 20 to 30 kgf. In the case of less than 1 kgf, the pre-lithiation does not occur sufficiently, and the initial irreversible reaction occurs largely, and the volume expansion is not suppressed during the whole lithiation process, which makes the contact between the active materials undesirable. Further, when it exceeds 50 kgf, the lithiation may proceed excessively and the electrode capacity may be reduced, and the excessive pressure may be applied to the electrode, so that the active material damage may occur.

In addition, the time for contacting the electrode with the lithium metal may be 30 minutes to 10 hours, more preferably 0.3 to 5 hours, and most preferably 0.5 to 3 hours. If the contact time is less than 30 minutes, the initial irreversible may occur largely because the pre-lithiation does not occur sufficiently, and if it exceeds 10 hours, the problem of a decrease in electrode capacity may occur because the pre-lithiation proceeds excessively.

Next, in the pre-lithiation step, the electrochemical method may be a method of lithiating the surface of the negative electrode by charging a current or voltage with the negative electrode. This is to perform the initial irreversible reaction, which is shown in the subsequent initial charge/discharge process, in advance. At this time, lithium metal may be applied to the negative electrode, and there is no particular limitation in the method of applying lithium metal to the negative electrode. The charging may be performed by manufacturing a battery cell including a negative electrode coated with the lithium metal.

According to the prelithiation method by electrochemical method, a separator is interposed between the negative electrode to be pre-lithiated and lithium metal, and each of the negative electrode and lithium metal is connected to the lead wire, then two lead wires to the charge-discharge device to perform charging by applying electric current. In the charging, a current may be flown through a constant current (CC) charging method, or a current may be flown through a constant current/constant voltage(CC/CV) charging method.

In the CC/CV charging, CC-charging may be performed with a current amount of 0.01 C to 1 C or less, and CV-charging may be performed when reaching 0.001V to 0.01V. As an example of the CC/CV charging method, charging is performed with a constant current value of 0.1 C, and when it reaches 0.005V, charging is performed with a constant voltage of 0.005V. The charging end condition can be set to the irreversible capacity to be charged. At this time, it is not necessary to charge only the irreversible capacity, and it may be set to a capacity slightly exceeding the initial efficiency to be compensated in order to improve the performance of the battery.

If, when the charging is performed with a current amount of less than 0.01 C, the time required for lithiation of the negative electrode surface becomes longer, and accordingly, the efficiency of the process may be deteriorated. Conversely, when the charge current exceeds 1 C, an excessively high C-rate current is applied before the initial irreversible reaction, and thus, dendrite may be formed on the surface of the negative electrode.

In addition, when the charging is performed in a section exceeding 0.01 V, it is difficult to form a stable film on the negative electrode surface, and when performing in a section less than 0.001 V, dendrites may be formed on the surface of the negative electrode.

The charge is ended when the total charge reaches the target capacity (irreversible capacity to be compensated).

The pre-lithiation method according to an embodiment of the present invention may further include a stabilization process of the negative electrode after the pre-lithiation step. The stabilization process is a step of leaving the negative electrode lithiated. Even if the electrode is subjected to the pre-lithiation process, there may be a change in the volume of the electrode as the lithium ion moves through the diffusion in the electrode. Such a change in volume increases the irreversible capacity of the electrode, and thus in the present invention, a stabilization step of applying pressure to the electrode is performed in order to further mitigate the volume change of the electrode. The stabilization step may be performed inside the electrolyte. In particular, the stabilization step may be a step of leaving the negative electrode in a state in which a predetermined pressure is applied to the negative electrode through the jig of the pre-lithiation step.

The temperature condition of the stabilization step may be −10 degrees to 70 degrees Celsius, preferably 10 degrees to 50 degrees. When the stabilization step is performed at a temperature of less than −10 degrees Celsius, it may be difficult to form a stable film, and when it exceeds 70 degrees, the film formed on the surface of the negative electrode may cause a thermal decomposition reaction, which is not preferable.

In addition, the time for performing the stabilization step is preferably 12 hours to 48 hours, more preferably 18 hours to 36 hours, and most preferably 20 hours to 30 hours. If the time for applying the pressure in the stabilization step is less than 12 hour, it is difficult to achieve the object of the present invention, and if it exceeds 48 hours, it is not desirable because the shape stability of the electrode may be deteriorated.

Next, a negative electrode for a secondary battery used in a method for pre-lithiating a negative electrode for a secondary battery according to the present invention will be described.

The negative electrode for the secondary battery may be prepared by applying a negative electrode mixture containing a negative electrode active material on a current collector and drying it, and the negative electrode mixture may optionally further include a binder, a conductive material, and a filling material, if necessary.

Examples of the negative electrode active material include carbon such as non-graphitized carbon and graphite carbon; metal complex oxide such as $Li_xFe_2O_3(0 \leq x \leq 1)$, $Li_xWO_2(0 \leq x \leq 1)$, $Sn_xMe_{1-x}Me'_yO_z$(Me: Mn, Fe, Pb, Ge; Me': Al, B, P, Si, groups 1, 2, and 3 of the periodic table, halogen; $0 \leq x \leq 1$; $1 \leq y \leq 3$; $1 \leq z \leq 8$); lithium alloy; silicon alloy; tin alloy; metal oxides such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, and $Bi_2O_5$; conductive polymers such as polyacetylene; and Li—Co—Ni-based materials. Particularly, a graphite-based compound or a silicon-based compound is preferred, and a silicon-based compound is most preferred when considering initial irreversible capacity and volume change. Among the silicon-based compounds, silicon oxide such as SiO is most preferred.

The sheet for the negative electrode collector generally has a thickness of 3 to 500 micrometers. The negative electrode current collector is not particularly limited as long as it has electrical conductivity without causing chemical changes in the battery, and examples thereof include copper, stainless steel, aluminum, nickel, titanium, sintered carbon, copper or stainless steel of which the surface has been treated with carbon, nickel, titanium, silver or the like, aluminum-cadmium alloy, or the like. In addition, like the positive electrode current collector, fine unevenness can be formed on the surface to enhance the bonding force of the negative electrode active material, and it can be used in various forms such as a film, a sheet, a foil, a net, a porous body, a foam, and a nonwoven fabric.

The conductive material is usually added in an amount of 1 to 30% by weight based on the total weight of the mixture including the positive electrode active material. Such a conductive material is not particularly limited as long as it has electrical conductivity without causing a chemical change in the battery, and examples thereof include graphite such as natural graphite and artificial graphite; carbon black such as carbon black, acetylene black, Ketjen black, channel black, furnace black, lamp black, and summer black; conductive fibers such as carbon fiber and metal fiber; metal powders such as carbon fluoride, aluminum and nickel powder; conductive whiskey such as zinc oxide and potassium titanate; conductive metal oxides such as titanium oxide; and conductive materials such as polyphenylene derivatives and the like.

The binder is added in an amount of 1 to 30% by weight, on the basis of the total weight of the mixture containing the positive electrode active material, as a component that assists in bonding between the active material and the conductive material and bonding to the current collector. Examples of such binders include polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene terpolymer (EPDM), sulfonated EPDM, styrene butylene rubber, fluorine rubber, various copolymers and the like.

The filler is optionally used as a component for inhibiting expansion of an electrode, and is not particularly limited as long as it is a fibrous material without causing a chemical change in the battery. Examples of the filler include olefin polymers such as polyethylene and polypropylene; fibrous materials such as glass fibers and carbon fibers.

Other components, such as viscosity modifiers, adhesion promoters, and the like may be further included optionally or in combination of two or more. The viscosity modifier is a component that adjusts the viscosity of the electrode mixture so that the mixing process of the electrode mixture and the coating process on the current collector thereof may be easy, and may be added up to 30% by weight based on the total weight of the negative electrode mixture. Examples of such a viscosity modifier include carboxy methyl cellulose, polyvinylidene fluoride, and the like, but are not limited thereto. In some cases, the solvent described above may serve as a viscosity modifier.

The adhesion promoter is an auxiliary component added to improve the adhesion of the active material to the current collector and may be added in less than 10% by weight compared to the binder, and some examples thereof include oxalic acid, adipic acid, formic acid, acrylic acid derivatives, itaconic acid derivatives, and the like.

The present invention also provides a method for manufacturing a negative electrode for a secondary battery.

The manufacturing method of the negative electrode for the secondary battery includes: a step of preparing a negative electrode slurry by mixing a negative electrode active material, a conductive material, and a binder;

a step of coating the negative electrode slurry on a current collector;

a step of rolling the current collector coated with the negative electrode slurry and punching and drying it to be unit electrodes; and a step of pre-lithiating the unit electrodes according to the pre-lithiation method. At this time, the negative electrode active material, the conductive material, the binder, the current collector and the pre-lithiation method are as described above.

The present invention also provides a secondary battery including a negative electrode prepared by the method. Specifically, the secondary battery includes a negative electrode for secondary battery and has a structure in which an electrode assembly is built in a battery case, characterized in that a separator is wound between the negative electrode and the positive electrode, and lithium salt-containing non-aqueous electrolyte is impregnated in the electrode assembly. At this time, the negative electrode may be manufactured as a lithium secondary battery after being assembled as an electrode assembly and sealed in a battery case together with an electrolyte. The secondary battery may be a cylindrical battery, a prismatic battery, a pouch-type battery, or a coin-type battery, and the shape of the battery is not particularly limited.

The electrode assembly is not particularly limited as long as it has a structure made of a positive electrode and a negative electrode and a separator interposed therebetween, for example, a folding structure, or a stacked structure, or a stack/folding type (SNF) structure, or lamination/stack-type (LNS) structure.

The folding-type electrode assembly includes at least one positive electrode, at least one negative electrode, and at least one separator interposed between the positive electrode and the negative electrode and the positive electrode, the separator, and the negative electrode may have a structure in which one end and the other end do not cross each other.

Further, the stack-type electrode assembly includes at least one positive electrode, at least one negative electrode, and at least one separator interposed between the positive electrode and the negative electrode and the positive electrode, the separator, and the negative electrode may have a structure in which one end and the other end cross each other.

The stack/folding-type electrode assembly includes at least one positive electrode, at least one negative electrode, and at least one separator interposed between the positive electrode and the negative electrode, and the separator includes a first separator and a second separator. Further, the positive electrode, the first separator, and the negative electrode may have a structure in which one end and the other end do not cross each other. The second separator may have a structure surrounding an electrode side on which an electrode tab is not formed.

The electrode assembly of the lamination-stack structure may include one or more improved electrodes having a laminate laminated on one or both surfaces thereof. The improved electrode, for example, may be implemented in a structure in which the separator is bonded to one surface of the positive electrode or the negative electrode. In addition, the separator may be implemented in a structure that is bonded to both sides of the positive electrode or both sides of the negative electrode. In addition, the positive electrode, the separator and the negative electrode may be implemented in a structure that is bonded to each other in a state where the separator is interposed between the positive electrode and the negative electrode.

In the secondary battery according to the present invention, the positive electrode may be prepared by applying an electrode mixture containing a positive electrode active material on a current collector and drying it, and the positive electrode mixture may optionally further include a binder, a conductive material, a filler, and the like, if necessary.

In the present invention, the positive electrode collector generally has a thickness of 3 to 500 micrometers. The positive electrode current collector is not particularly limited as long as it has high conductivity without causing a chemical change in the battery. Examples of the positive electrode current collector include stainless steel, aluminum, nickel, titanium, sintered carbon or aluminum or stainless steel of which the surface has been treated with carbon, nickel, titanium, silver, or the like. The current collector may have fine irregularities on the surface thereof to increase the adhesion of the positive electrode active material, and various forms such as a film, a sheet, a foil, a net, a porous body, a foam, and a nonwoven fabric are possible.

In the present invention, the positive electrode active material is a material capable of causing an electrochemical reaction and a lithium transition metal oxide, and contains two or more transition metals. Examples thereof include: layered compounds such as lithium cobalt oxide ($LiCoO_2$) and lithium nickel oxide ($LiNiO_2$) substituted with one or more transition metals; lithium manganese oxide substituted with one or more transition metals; lithium nickel oxide represented by the formula $LiNi_{1-y}M_yO_2$ (wherein M=Co, Mn, Al, Cu, Fe, Mg, B, Cr, Zn or Ga and contains at least one of the above elements, $0.01 \leq y \leq 0.7$); lithium nickel cobalt manganese composite oxide represented by the formula $Li_{1+z}Ni_bMn_cCo_{1-(b+c+d)}M_dO_{(2-e)}A_e$ such as $Li_{1+z}Ni_{1/3}Co_{1/3}Mn_{1/3}O_2$, $Li_{1+z}Ni_{0.4}Mn_{0.4}Co_{0.2}O_2$ etc. (wherein $-0.5 \leq z \leq 0.5$, $0.1 \leq b \leq 0.8$, $0.1 \leq c \leq 0.8$, $0 \leq d \leq 0.2$, $0 \leq e \leq 0.2$, b+c+d<1, M=Al, Mg, Cr, Ti, Si or Y, and A=F, P or Cl); olivine-based lithium metal phosphate represented by the formula $Li_{1+x}M_{1-y}M'_yPO_{4-z}X_z$ (wherein M=transition metal, preferably Fe, Mn, Co or Ni, M'=Al, Mg or Ti, X=F, S or N, and $-0.5 \leq x \leq 0.5$, $0 \leq y \leq 0.5$, $0 \leq z \leq 0.1$).

In the positive electrode, additive materials such as a binder, a conductive material, and a filling material are as described above.

The separator is interposed between the positive electrode and the negative electrode, and an insulating thin film having high ion permeability and mechanical strength is used. The pore diameter of the separator is generally 0.01 to 10 micrometers, and the thickness is generally 5 to 300 micrometers. Examples of such a separator include olefin-based polymers such as polypropylene which is chemically resistant and hydrophobic; a sheet or a nonwoven fabric made of glass fiber, polyethylene or the like. When a solid electrolyte such as a polymer is used as the electrolyte, the solid electrolyte may also serve as a separator.

The lithium salt-containing non-aqueous electrolyte solution consists of an electrolyte and a lithium salt. And a non-aqueous organic solvent, an organic solid electrolyte, an inorganic solid electrolyte, and the like are used as the electrolyte solution.

Examples of the non-aqueous organic solvent include N-methyl-2-pyrrolidinone, propylene carbonate, ethylene carbonate, butylenecarbonate, dimethyl carbonate, diethyl carbonate, gamma-Butyrolactone, 1,2-dimethoxyethane, tetrahydroxyfuran, 2-methyltetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxymethane, dioxolane derivatives, sulfolane, methyl sulfolane, 1,3-dimethyl-2-imidazolidinone, propylene carbonate derivatives, tetrahydrofuran derivatives, ethers, methyl pyrophosphate, ethyl propionate, etc.

Examples of the organic solid electrolyte include a polymer electrolyte such as a polyethylene derivative, a polyethylene oxide derivative, a polypropylene oxide derivative, a phosphate ester polymer, an agitation lysine, a polyester sulfide, a polyvinyl alcohol, a polyvinylidene fluoride, a polymerizer including an ionic dissociation group, and the like.

Examples of the inorganic solid electrolyte include nitrides, halides, and sulfates of Li such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salt is a substance that is soluble in the non-aqueous electrolyte. The examples of the lithium salt include $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroborane lithium, lower aliphatic carboxylic acid lithium, lithium 4-phenylborate, imide and the like.

For the purpose of improving charge/discharge characteristics, flame retardancy, etc., pyridine, triethylphosphite, triethanolamine, cyclic ether, ethylenediamine, n-glyme, hexaphosphoric triamide, nitrobenzene derivative, sulfur, quinone imine dye, N-substituted oxazolidinone, N-substituted imidazolidine, ethylene glycol dialkyl ether, ammonium salt, pyrrole, 2-methoxyethanol, aluminum trichloride, etc. may be added to the electrolyte. In some cases, a halogen-containing solvent such as carbon tetrachloride or ethylene trifluoride may be further added to impart nonflammability, or a carbon dioxide gas may be further added to improve the high-temperature storage characteristics, and FEC (Fluoro-EthyleneCarbonate), PRS (Propene sultone), and the like may be further added.

In one preferred example, a lithium salt such as $LiPF_6$, $LiClO_4$, $LiBF_4$, and $LiN(SO_2CF_3)_2$ may be added to a mixed solvent of a cyclic carbonate of EC or PC which is a high-dielectric solvent and a linear carbonate of DEC, DMC or EMC which is low viscosity solvent to thereby prepare a non-aqueous electrolyte containing a lithium salt.

Hereinafter, the present invention will be described in detail with reference to examples. However, the embodiments according to the present invention may be modified into various other forms, and the scope of the present invention should not be construed as being limited to the examples described below. The examples of the present invention are provided to more fully describe the present invention to those skilled in the art.

EXAMPLE 1

Preparation of Negative Electrode

92% by weight of negative electrode active material with graphite and SiO mixed at a weight ratio of 3:7, 3% by weight of carbon black as a conductive material, 3% by weight of SBR as a binder, and 1.5% by weight of CMC as a thickener were added to a water-based solvent and mixed to thereby prepare a negative electrode mixture slurry. The negative electrode mixture slurry was applied to a negative electrode plate, a copper (Cu) thin film having a thickness of 10 μm, and dried to prepare a negative electrode, followed by roll press.

Pre-Lithiation Preparation (Electrolyte Impregnation) Process

Before the pre-lithiation process, the negative electrode was put into an electrolyte bath containing electrolyte, including 3% by weight vinylene carbonate, in which $LiPF_6$ 1M was dissolved in a solvent made of ethylene carbonate (EC) and ethyl methyl carbonate (EMC) in a volume ratio of 3:7, and was then impregnated (wetting) in the electrolyte for 24 hours. At this time, 10 minutes after the negative electrode was injected into the electrolyte bath, the process of removing bubbles and moisture in the electrode was repeated 3 times for 30 seconds by applying a vacuum while the negative electrode was contained in the electrolyte bath for a total of 90 seconds. At this time, the interval between each vacuum application was 10 seconds.

Pre-Lithiation Progress

After interposing a porous separator of polyolefin between the negative electrode and the lithium metal in the electrolyte, the negative electrode and the lithium metal were connected to each other and charged. CC charging was performed with a constant current value of 0.1 C, and when reaching 0.005V, CV charging was performed. The total charge amount was cut off at a time point when the initial efficiency of the negative electrode became 100% by compensating for the irreversible capacity of the negative electrode. Thereafter, the lithium metal was removed from the negative electrode. Thereafter, the negative electrode was left at room temperature for 24 hours to perform a stabilization process.

Preparation of Lithium Secondary Battery

An electrode assembly was prepared by performing assembly in a stacking method by interposing a polyolefin separator between the prepared negative electrode and the positive electrode using $LiCoO_2$ as a positive electrode active material.

After deriving the positive electrode tab and the negative electrode tab from the positive electrode plate and negative electrode plate, respectively, each of the positive electrode tab and the negative electrode tab was wrapped with the same material and the same thickness of the adhesive tab film so that the positive electrode tab and the negative electrode tab may include all of the portions overlapping with the sealing portion.

An aluminum foil metal foil layer was formed on a CPP heat insulating layer (thickness 40 μm), and a pouch case was then manufactured by laminating an insulating layer made of nylon on the aluminum foil metal foil layer. After bending the manufactured pouch exterior material to form an upper exterior material and a lower exterior material, the electrode assembly receiving portion was formed in the lower exterior material through a pressing process.

After the electrode assembly is accommodated in the receiving portion, the electrolyte (the electrolyte generated by a process in which $LiPF_6$ 1M is dissolved in a solvent of ethylene carbonate (EC) and ethyl methyl carbonate (EMC) in a volume ratio of 3:7, and an additive such as VC and FEC is further added) was injected.

Subsequently, after bringing the upper exterior material into contact with the lower exterior material, a sealing part was heat-sealed to form a seal to prepare a pouch-type battery cell.

EXAMPLE 2

In the pre-lithiation preparation process, a pouch-type battery cell was prepared in the same manner as in Example 1, except that the vacuum was applied twice in total for 45 seconds.

EXAMPLE 3

In the pre-lithiation preparation process, a pouch-type battery cell was prepared in the same manner as in Example 1, except that the vacuum was repeatedly applied four times for 60 seconds.

EXAMPLE 4

In the pre-lithiation preparation process, a pouch-type battery cell was prepared in the same manner as in Example 1, except that the negative electrode was immersed in the electrolyte for 30 hours.

EXAMPLE 5

In the case of pre-lithiation, a pouch-type battery cell was prepared in the same manner as in Example 1, except that the direct contact method of lithium metal was used instead of the electrochemical method. After the lithium metal was contacted to the negative electrode in the electrolyte of Example 1, the pre-lithiation by the direct contact method was performed for 30 minutes under a pressure of 20 kgf. After the pre-lithiation, the lithium metal was removed from the negative electrode. Thereafter, the negative electrode was left at room temperature for 24 hours to perform a stabilization process.

EXAMPLE 6

In the pre-lithiation preparation process, a pouch-type battery cell was prepared in the same manner as in Example 1, except that the negative electrode was immersed in the electrolyte for 60 hours.

EXAMPLE 7

In the pre-lithiation preparation process, a pouch-type battery cell was prepared in the same manner as in Example 1, except that the vacuum was applied 10 times for 40 seconds.

EXAMPLE 8

In the pre-lithiation preparation process, a pouch-type battery cell was prepared in the same manner as in Example 1, except that the vacuum was applied once for 400 seconds.

COMPARATIVE EXAMPLE 1

A pouch-type battery cell was prepared in the same manner as in Example 1, except that vacuum was not applied without proceeding with the electrolytic solution impregnation process before the pre-lithiation process.

COMPARATIVE EXAMPLE 2

The pouch-type battery cell was manufactured in the same manner as in Example 1, except that the negative electrode was immersed in the electrolyte for 48 hours before the pre-lithiation process, and vacuum was not applied.

EXPERIMENTAL EXAMPLE 1

The lithium secondary batteries of the above Examples and Comparative Examples were fully charged (SOC 100) at a constant current of 20 mAh and then fully discharged (SOC 0), and the cell thickness when fully charged and the cell thickness when fully discharged were measured. Then, the cell thickness increase rate was calculated as shown in Equation 1 below. The results are shown in Table 1 below.

Cell thickness increase rate (%)={(full charge thickness−full discharge thickness)/full discharge thickness}×100 (Equation 1)

TABLE 1

| | Vacuum application condition | Electrolyte Impregnation time (hours) | Thickness increase rate (%) |
|---|---|---|---|
| Example 1 | 30 seconds * 3 times | 24 | 4.08 |
| Example 2 | 45 seconds * 2 times | 24 | 5.23 |
| Example 3 | 60 seconds * 4 times | 24 | 5.97 |
| Example 4 | 30 seconds * 3 times | 30 | 4.38 |
| Example 5 | 30 seconds * 3 times | 24 | 6.39 |
| Example 6 | 30 seconds * 3 times | 60 | 11.87 |
| Example 7 | 40 seconds * 10 times | 24 | 6.79 |
| Example 8 | 400 seconds * 1 time | 24 | 7.00 |
| Comparative Example 1 | X | X | 10.77 |
| Comparative Example 2 | X | 48 | 7.84 |

As can be seen in Table 1 above, when comparing the batteries of Examples 1 to 5 and Examples 7 and 8 with an electrolyte impregnation time of 24 hours to 30 hours with the battery of Comparative Example 2 with an electrolyte impregnation time of 48 hours, it can be seen that although the batteries of the above Examples showed a shorter electrolyte impregnation time than that of the battery of Comparative Example 2, the thickness increase rate was smaller than that of Comparative Example 2. From these experimental results, it can be seen that the pre-lithiation method of the present invention has the effect of reducing the electrolyte impregnation time and reducing the thickness increase rate of the battery.

In addition, the battery of Example 6 has a large increase rate in the thickness of the battery compared to the batteries of the other Examples, which is presumed that as the impregnation time of the electrolyte became too long in the state that it was not pre-lithiated, the rate of increase in the thickness of the battery rather increased due to a decrease in electrode adhesion. Therefore, in the pre-lithiation method of the present invention, it is preferable that the impregnation time of the negative electrode is less than 60 hours.

In addition, the battery of Example 7 in which vacuum application was performed 10 times and the battery of Example 8 in which vacuum application was performed once for 400 seconds were found to have a greater thickness increase rate compared to the batteries of Examples 1 to 6. This is presumed to be because, if the number of vacuum applications is too large or if the vacuum is applied too long at one time, the composition of the electrolyte may change due to evaporation of the electrolyte, which may negatively affect stable film formation. Therefore, in the pre-lithiation method of the present invention, it is considered that applying the vacuum at a suitable number of times for a suitable time can maximize the effect of the invention.

The above description is merely illustrative of the technical idea of the present invention, and those skilled in the art to which the present invention pertains may make various modifications and variations without departing from the essential characteristics of the present invention. Therefore, the embodiments disclosed in the present invention are not intended to limit the technical spirit of the present invention, but to explain the protection scope of the present invention and should be interpreted by the claims below, and it should be interpreted that all technical spirits within the equivalent scope are included in the scope of the present invention.

The invention claimed is:

1. A method for pre-lithiating a negative electrode for a secondary battery, the method comprising:
   immersing the negative electrode for the secondary battery in an electrolyte to perform electrolyte impregnation; and
   pre-lithiating the negative electrode,
   wherein immersing the negative electrode for the secondary battery in an electrolyte comprises:
   injecting the negative electrode into an electrolyte bath comprising the electrolyte; and
   removing air bubbles and moisture in the negative electrode by applying a vacuum to the electrolyte bath in which the negative electrode is immersed,
   wherein the vacuum is repeatedly applied twice or more,
   wherein each vacuum is applied for a time of 1 second to 60 seconds,
   wherein a time for immersing the negative electrode is 6 hours to 48 hours.

2. The method of claim 1, wherein the vacuum is applied at an interval of 1 second to 60 seconds.

3. The method of claim 1, wherein the vacuum is applied to the electrolyte bath for a total time of 30 seconds to 300 seconds.

4. The method of claim 1, wherein the vacuum is performed within a time of 5 minutes to 60 minutes after the negative electrode is injected into the electrolyte bath.

5. The method of claim 1, wherein pre-lithiating the negative electrode comprises introducing lithium ions onto the negative electrode by a physicochemical method or electrochemical method.

6. The method of claim 5, wherein pre-lithiating the negative electrode further comprises a stabilization step of leaving the lithiated negative electrode after introducing lithium ions onto the negative electrode by the physicochemical method or electrochemical method.

7. The method of claim 5, wherein the physicochemical method is a method in which lithium metal is brought into direct contact with the negative electrode.

8. The method of claim 7, wherein a contact time between the negative electrode and lithium metal is 30 minutes to 10 hours.

9. The method of claim 5, wherein the electrochemical method is a method of lithiating a surface of the negative electrode by applying current or voltage to the negative electrode.

10. The method of claim 9, wherein CC-charging is performed with a current amount of 0.01 C to 0.5 C and CV-charging is performed when reaching 0.001V to 0.011.

11. A method for manufacturing a negative electrode for a secondary battery, the method comprising:
preparing a negative electrode slurry by mixing a negative electrode active material, a conductive material, and a binder;
coating the negative electrode slurry on a current collector;
rolling the current collector coated with the negative electrode slurry and punching and drying the current collector to be unit electrodes; and
pre-lithiating the unit electrode according to the pre-lithiation method of claim 1.

12. The method of claim 1, wherein the vacuum is applied 2 to 4 times, and wherein each vacuum is applied for a time of 30 seconds to 60 seconds.

* * * * *